United States Patent Office 2,957,028
Patented Oct. 18, 1960

2,957,028

VAPOR-PHASE PROCESS FOR THE PRODUCTION OF 2,2-DIALKYL-4-PENTENALS

Kent C. Brannock, Charles W. Hargis, and Howard S. Young, Kingsport, Tenn., assignors to Eastman Kodak Company, Rochester, N.Y., a corporation of New Jersey No Drawing. Filed June 18, 1958, Ser. No. 742,731

4 Claims. (Cl. 260—601)

This invention relates to a one-step, vapor-phase catalytic process for preparing 2,2-dialkyl-4-pentenals from allyl alcohol and aliphatic aldehydes having only one hydrogen atom on the alpha carbon atom.

In the copending application Serial No. 728,084, of Brannock, filed April 14, 1958, there is disclosed a one-step, liquid-phase process of preparing 2,2-dialkyl-4-pentenals from allyl alcohol and saturated aldehydes having the formula

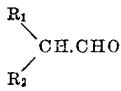

in which $R_1$ and $R_2$ are alkyl groups, in the presence of an acid catalyst and a high-boiling inert solvent. Our vapor-phase process offers considerably more flexibility of operation than is afforded by the liquid-phase method. In liquid-phase operation, reaction temperatures are restricted by the choice of liquid media and reactants. In contrast, vapor-phase operation allows freedom of choice as to reaction temperatures. Also, several different types of catalysts are active for making the 2,2-dialkyl-4-pentenals in the vapor-phase process, whereas only acids have been found useful in the liquid-phase process.

In carrying out our invention, we pass a mixture of allyl alcohol and a saturated aldehyde having the formula

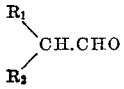

in which $R_1$ and $R_2$ are alkyl groups over a suitable catalyst contained in a tubular reactor, at a temperature of 125° C. to 450° C., preferably 175° C. to 250° C. The molar ratio of aldehyde to alcohol may vary from 0.1 to 1 to 10:1, and most suitably is in the range of 0.5:1 to 4:1. The rate of feed is adjusted to give a space velocity of 100 to 10,000 catalyst volumes per hour, preferably 150 to 500 catalyst volumes per hour. If desired, an inert diluent such as nitrogen can be added with the feed, to facilitate removal of product from the reaction zone.

The process of our invention is illustrated in greater detail by the following examples.

*Example 1.*—During a period of 6 hours and 52 minutes a mixture of 34.2 g. (0.589 mole) of allyl alcohol, 85.1 g. (1.178 moles) of isobutyraldehyde, and 1.913 moles of nitrogen was passed over activated carbon (Carbide & Carbon Chemicals Corporation, Columbia Grade CXAL) at a temperature of 200° C. and a space velocity of 360. The reaction product, 114.5 g., was collected in traps cooled to 10° C. and −80° C. Analysis of the reaction product showed that 18% of the allyl alcohol fed was converted to 2,2-dimethyl-4-pentenal. The yield of this compound was 79.8% based on allyl alcohol consumed.

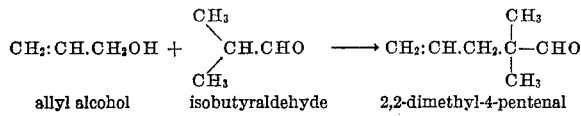

allyl alcohol    isobutyraldehyde    2,2-dimethyl-4-pentenal

*Example 2.*—A run was made similar to that of Example 1, except that the nitrogen diluent was omitted, and that the catalyst in this case was silica gel (Davison Chemical Corporation, Grade 01). The conversion and yield to 2,2-dimethyl-4-pentenal were of the same order as in Example 1.

Materials other than activated carbon and silical gel which were found to function catalytically in the vapor-phase synthesis of 2,2-dimethyl-4-pentenal by our process include Dow Dehydrogenation Catalyst Type B; U.O.P. Polymerization Catalyst No. 2; Davison Chemical Corporation Silica-Alumina Cracking Catalyst; Linde Air Products Company Molecular Sieve, Type 5A; and silica gel treated with $NH_4Cl$. However, with these catalysts, the conversion to 2,2-dimethyl-4-pentenal was substantially lower than with silica gel or activated carbon.

According to a reference in Ind. Eng. Chem. 47, 1373 (1955), Dow Dehydrogenation Catalyst Type B consists of calcium-nickel phosphate which is promoted with 2% of chromia. A detailed account of its preparation is given in Ind. Eng. Chem. 43, 2871 (1951). U.O.P. (Universal Oil Products) Polymerization Catalyst No. 2 is prepared from phosphoric acid and powdered kieselguhr. Davison Chemical Corporation Silica-Alumina Cracking Catalyst contains 13% alumina and about 87% silica. Linde Molecular Sieve Type 5A is a crystalline calcium aluminum silicate molecular sieve. The silica gel treated with $NH_4Cl$ was prepared as follows: Davison Grade 01 silica gel was contacted with vapors condensing from ammonium chloride powder which was being heated. The silica gel changed in color from white to yellow, and increased in weight by 0.2%.

The 2,2-dialkyl-4-pentenals can be hydrogenated to the corresponding 2,2-dialkyl-pentanols, some of the carboxylic acid esters of which are useful as oxidation-resistant plasticizers. They can also be oxidized to the corresponding 2,2-dialkyl pentenoic acids, the esters of which are useful monomers for the preparation of resinous polymers.

What we claim as our invention and desire to be secured by Letters Patent of the United States is:

1. A vapor-phase process of preparing 2,2-dimethyl-4-pentenal, which comprises passing a gaseous mixture of allyl alcohol and isobutyraldehyde, in a molar ratio of 0.5:1 to 4:1 aldehyde to alcohol, over a catalyst selected from the group consisting of activated carbon and silica gel, at a temperature of 175° C. to 250° C., at a space velocity of 150 to 500 catalyst volumes per hour.

2. A vapor-phase process of preparing 2,2-dimethyl-4-pentenal, which comprises passing a gaseous mixture of allyl alcohol and isobutyraldehyde, in a molar ratio of 0.5:1 to 4:1 aldehyde to alcohol, together with nitrogen as a diluent, over a catalyst selected from the group consisting of activated carbon and silica gel, at a temperature of 175° C. to 250° C., at a space velocity of 150 to 500 catalyst volumes per hour.

3. A vapor-phase process of preparing 2,2-dimethyl-4-pentenal, which comprises passing a gaseous mixture of allyl alcohol and isobutyraldehyde, in a molar ratio of 0.5:1 to 4:1 aldehyde to alcohol, over an activated carbon catalyst, at a temperature of 175° C. to 250° C., at a space velocity of 150 to 500 catalyst volumes per hour.

4. A vapor-phase process of preparing 2,2-dimethyl-4-pentenal, which comprises passing a gaseous mixture of allyl alcohol and isobutyraldehyde, in a molar ratio of 0.5:1 to 4:1 aldehyde to alcohol, over a silica gel catalyst, at a temperature of 175° C. to 250° C., at a space velocity of 150 to 500 catalyst volumes per hour.

References Cited in the file of this patent

UNITED STATES PATENTS 2,501,144    Saunders _____ Mar. 21, 1950